United States Patent [19]

Lima et al.

[11] 4,042,794
[45] Aug. 16, 1977

[54] METHOD AND MEANS FOR DETECTING AN OUTGOING FAILURE IN A BIDIRECTIONAL COMMUNICATIONS SPAN AND LOOPING THE SAME IN RESPONSE THERETO

[75] Inventors: Paul J. Lima; Todd V. Townsend, both of Washoe County, Nev.

[73] Assignee: Lynch Communication Systems, Reno, Nev.

[21] Appl. No.: 616,654

[22] Filed: Sept. 25, 1975

Related U.S. Application Data

[62] Division of Ser. No. 544,483, Jan. 27, 1975, Pat. No. 3,983,340.

[51] Int. Cl.² .............................................. H04B 3/46
[52] U.S. Cl. ............................................ 179/175.3 R
[58] Field of Search ............... 179/175.3 R, 175.31 R, 179/15 BF, 175.3 S, 175.3 F; 324/51

[56] References Cited

U.S. PATENT DOCUMENTS

| | | | |
|---|---|---|---|
| 2,666,099 | 1/1954 | Bonner | 179/175.3 R |
| 3,100,869 | 8/1963 | Disson et al. | 179/175.31 R |
| 3,371,165 | 2/1968 | Earle et al. | 179/175.3 R |
| 3,519,935 | 7/1970 | Hochgraf | 179/175.31 R |
| 3,692,964 | 9/1972 | Camiciottoli et al. | 179/175.31 R |
| 3,790,723 | 2/1974 | Stewart | 179/175.3 R |
| 3,842,220 | 10/1974 | Arras | 179/175.31 R |
| 3,864,533 | 2/1975 | Erlund | 179/175.2 S |

*Primary Examiner*—Douglas W. Olms
*Attorney, Agent, or Firm*—Phillips, Moore, Weissenberger, Lempio & Majestic

[57] ABSTRACT

An automatic span line switch for PCM communication lines is disclosed which isolates alarm conditions to an actual span line failure, as distinguished from failures in the terminal equipment. In addition, the switch uses a specific code transmission to provide fast switching and to permit identification of the direction of failure. Although the circuit is capable of switching span segments individually and independently, it can transmit an alarm to a distant central office and automatically establish an appropriate test loop in the presence of test transmissions when needed to permit single-end troubleshooting. The switch further tests the dead line continuously and stringently for error-free data transmission, and automatically resets without disturbing traffic when the trouble has been corrected. An extremely flexible priority system for selected channels is also provided, and the circuitry on both ends of all channels (including the protective channel) is identical to minimize parts inventory costs.

3 Claims, 16 Drawing Figures

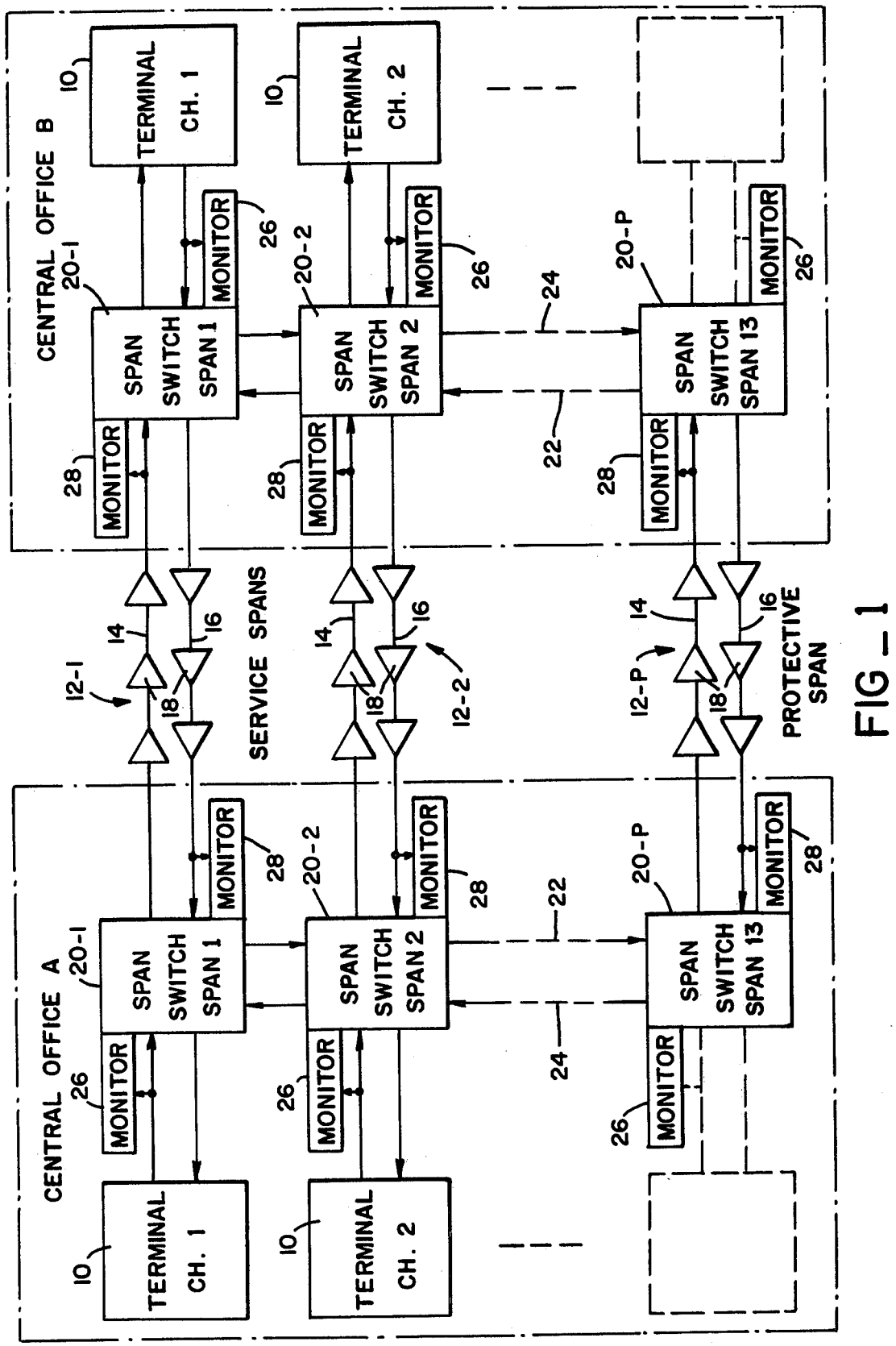
FIG_1

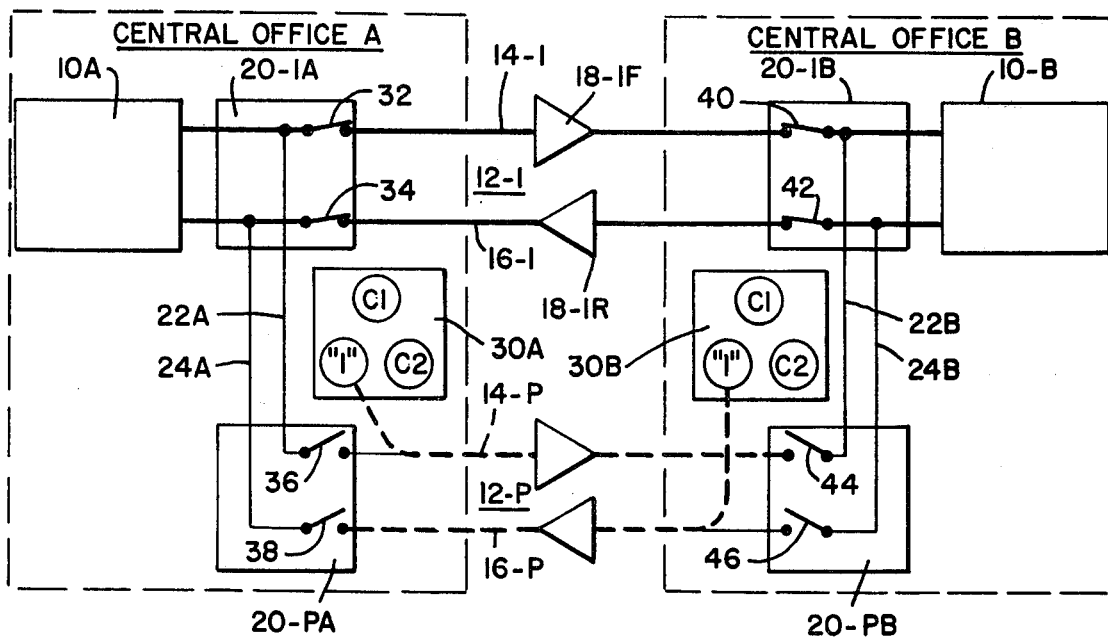
FIG_2a
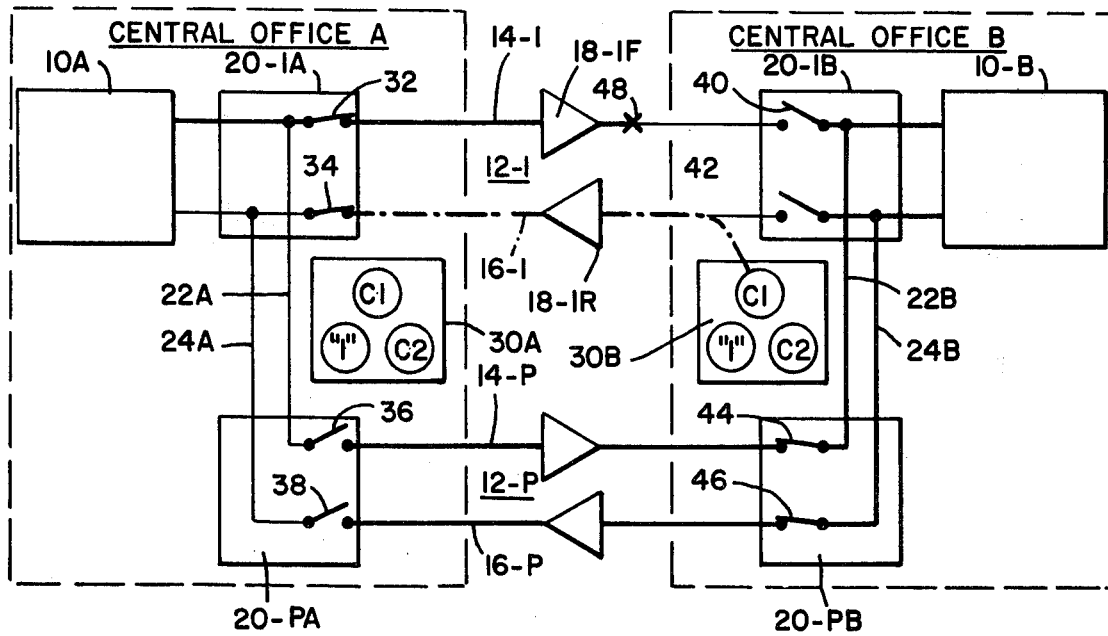
FIG_2b

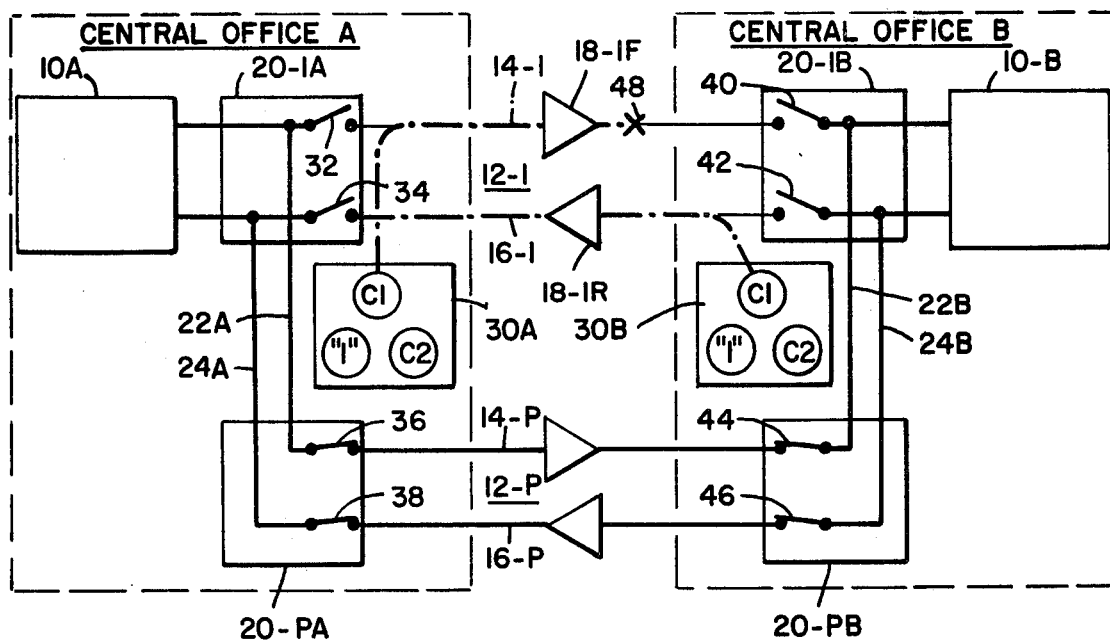
FIG_2c
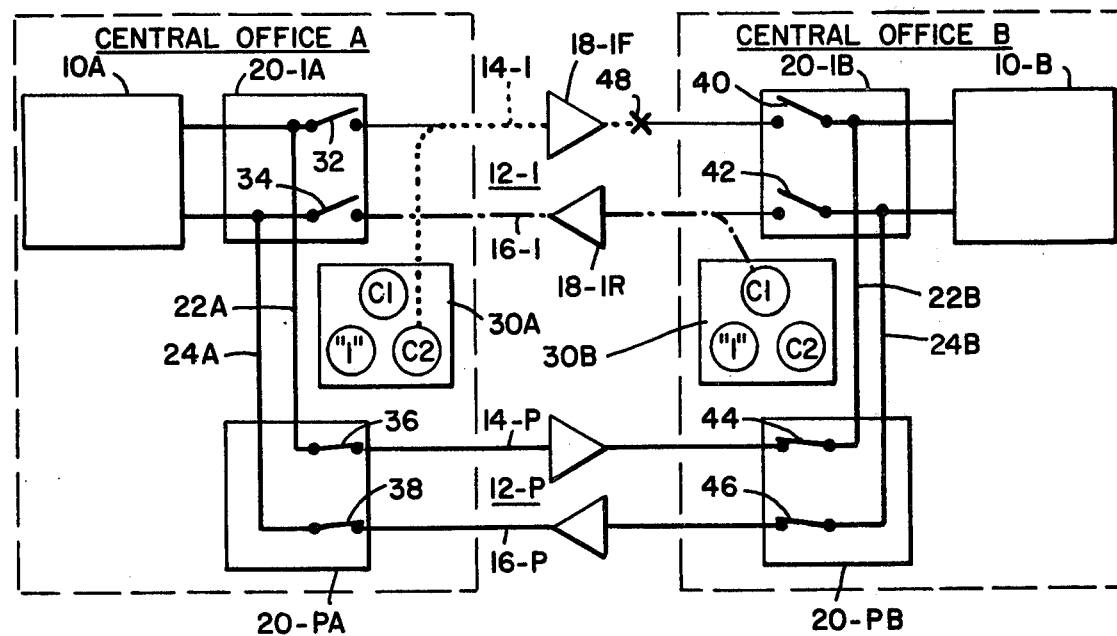
FIG_2d

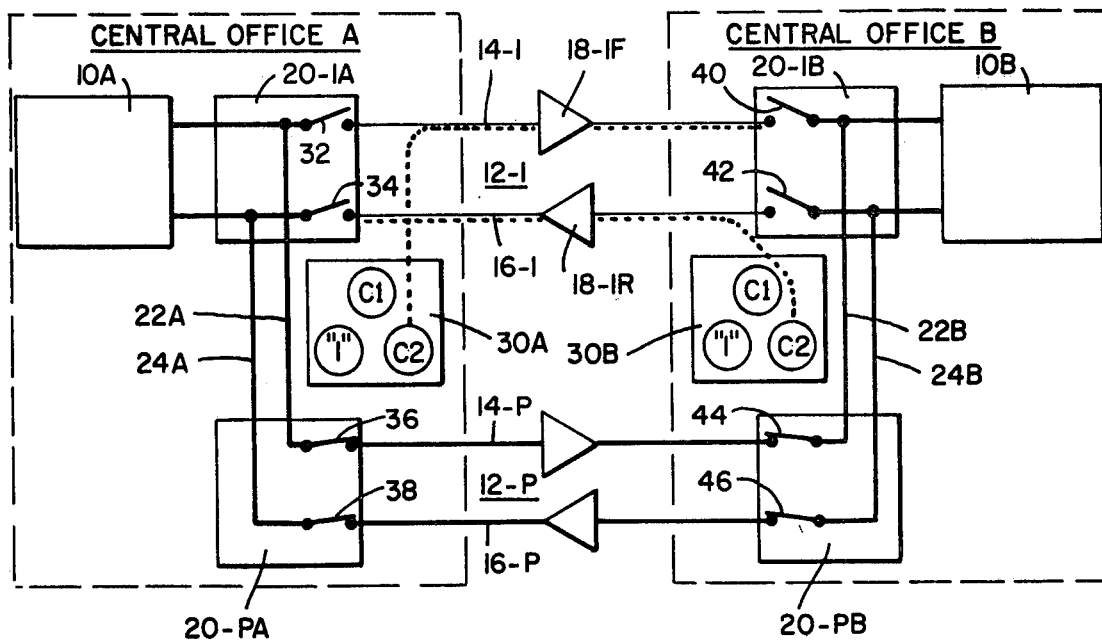
FIG_2e
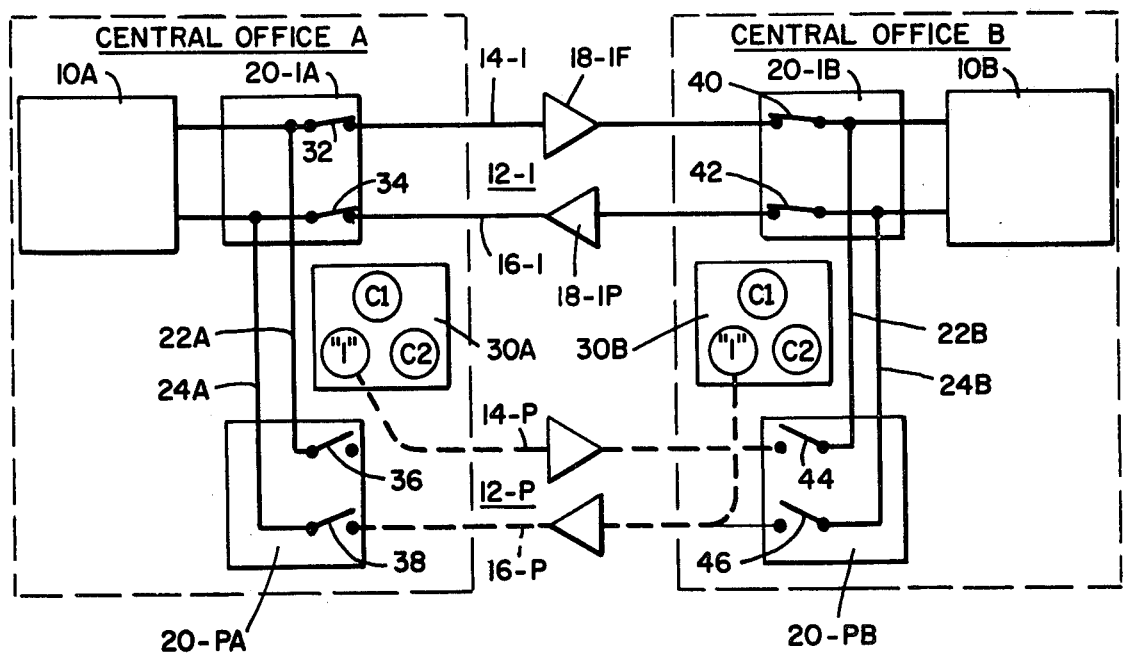
FIG_2f

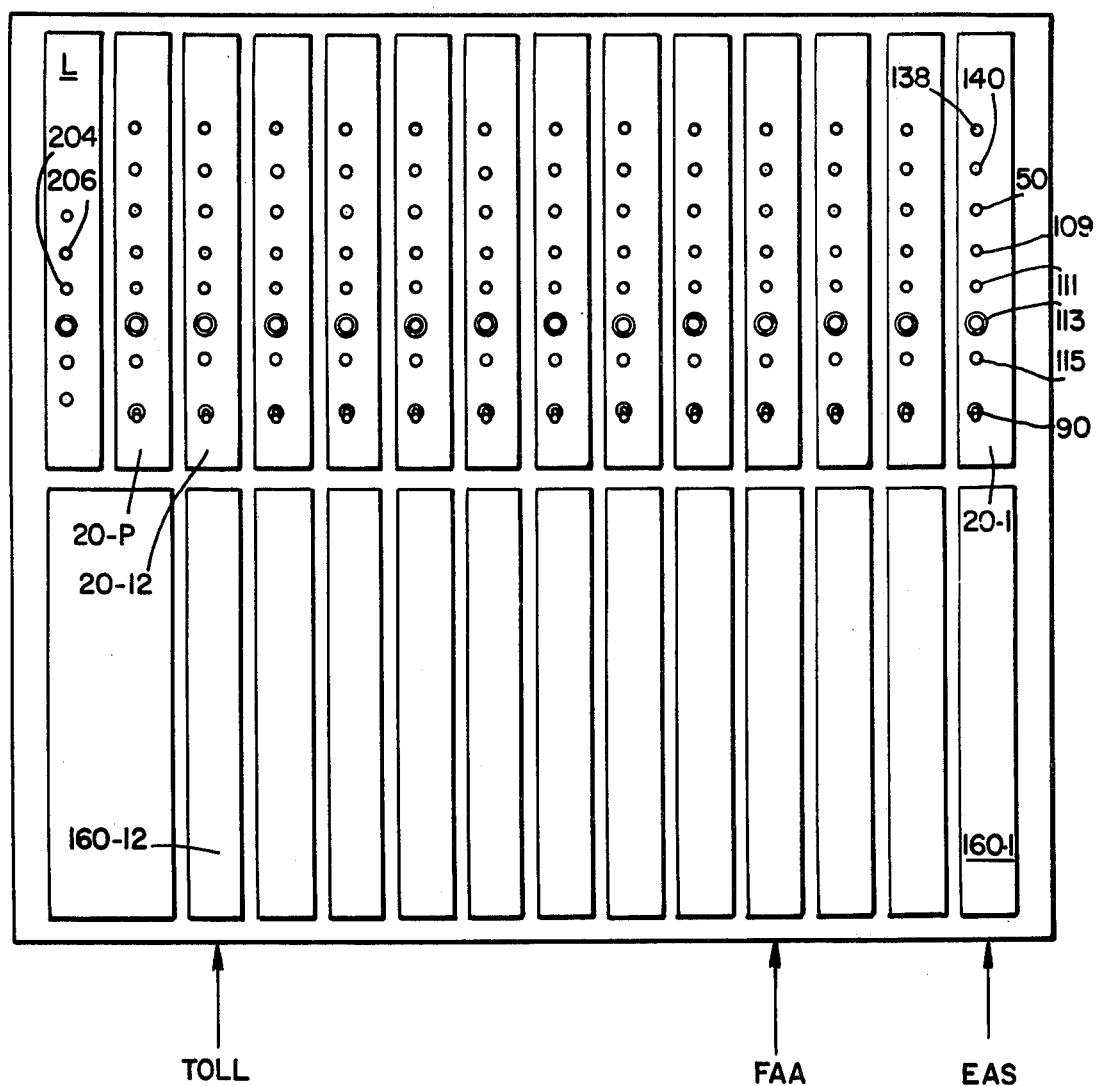
FIG_8
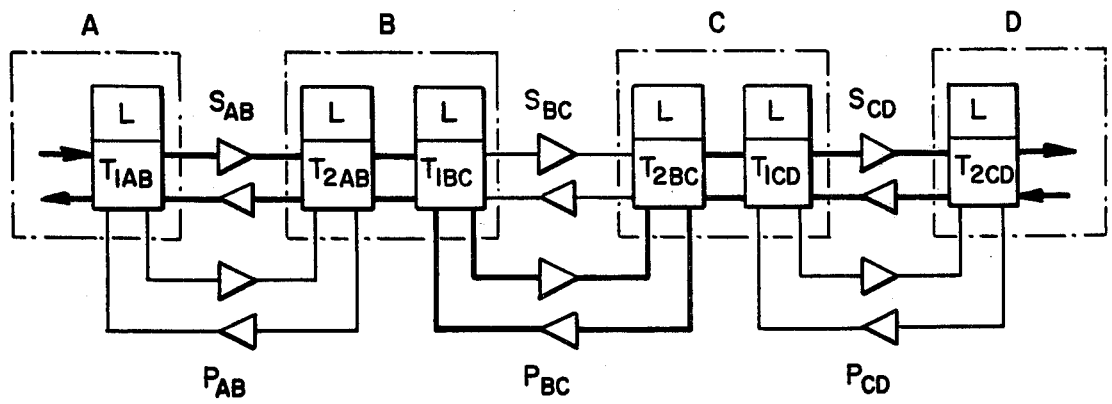
FIG_3

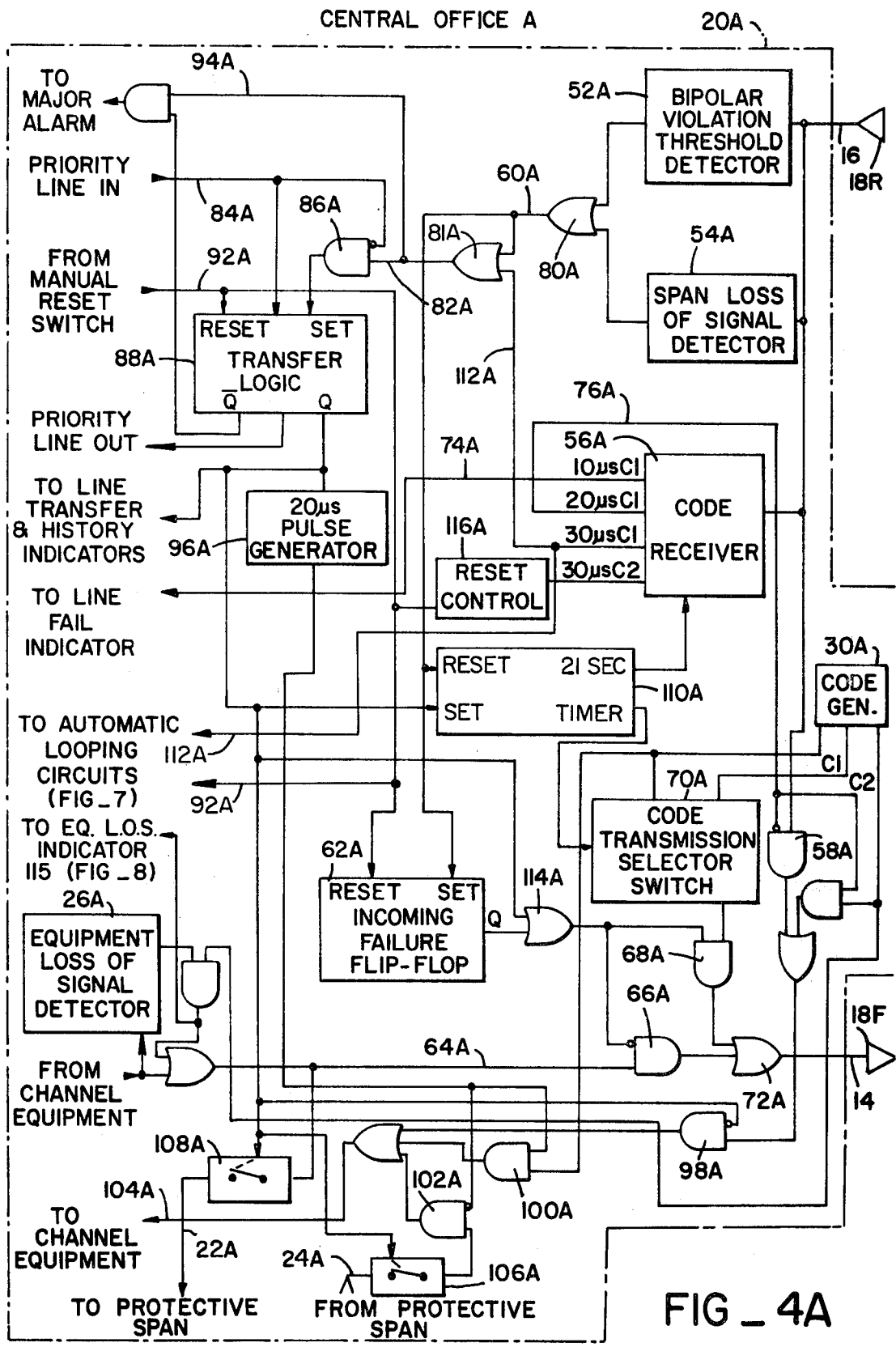
FIG_4A

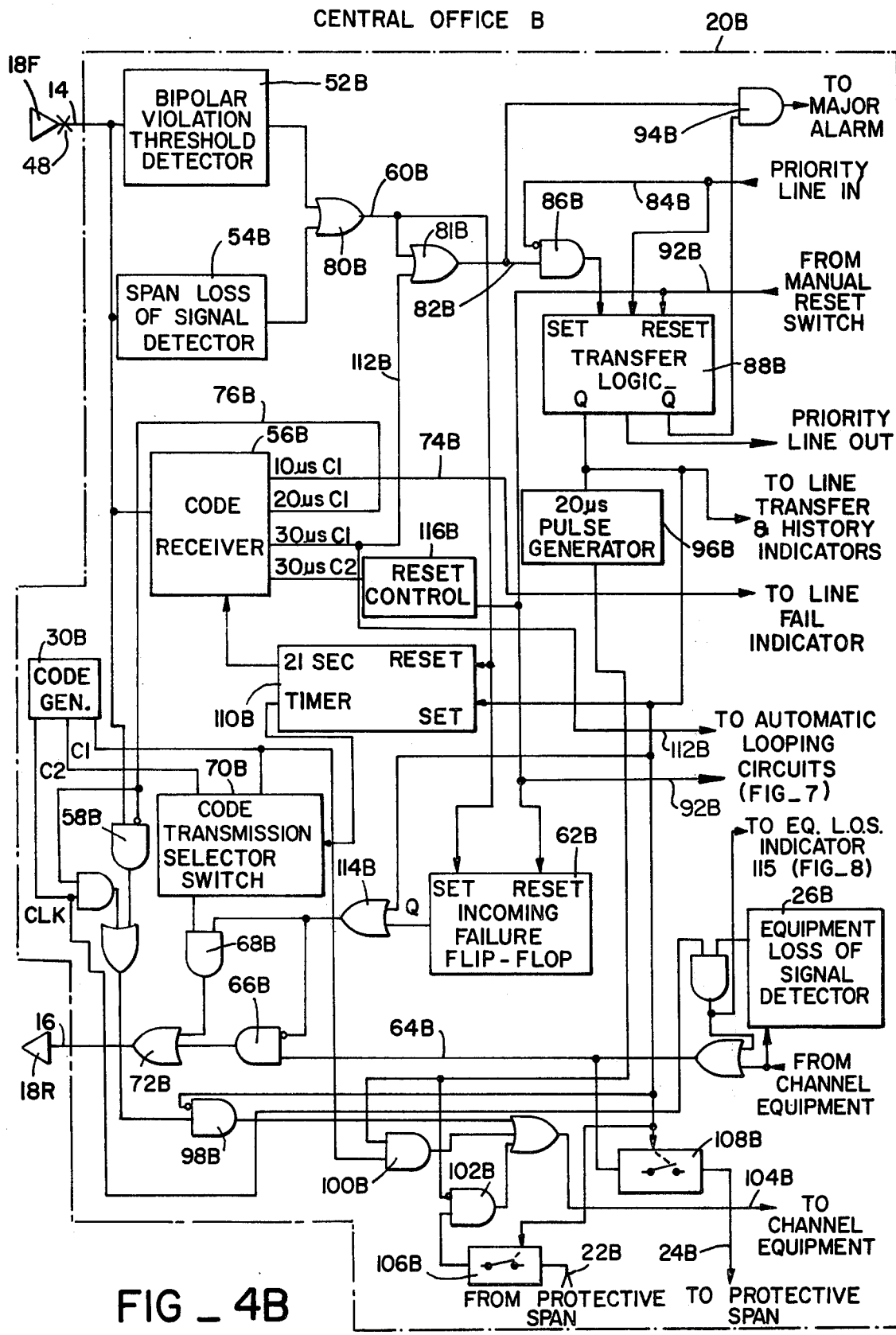
FIG_4B

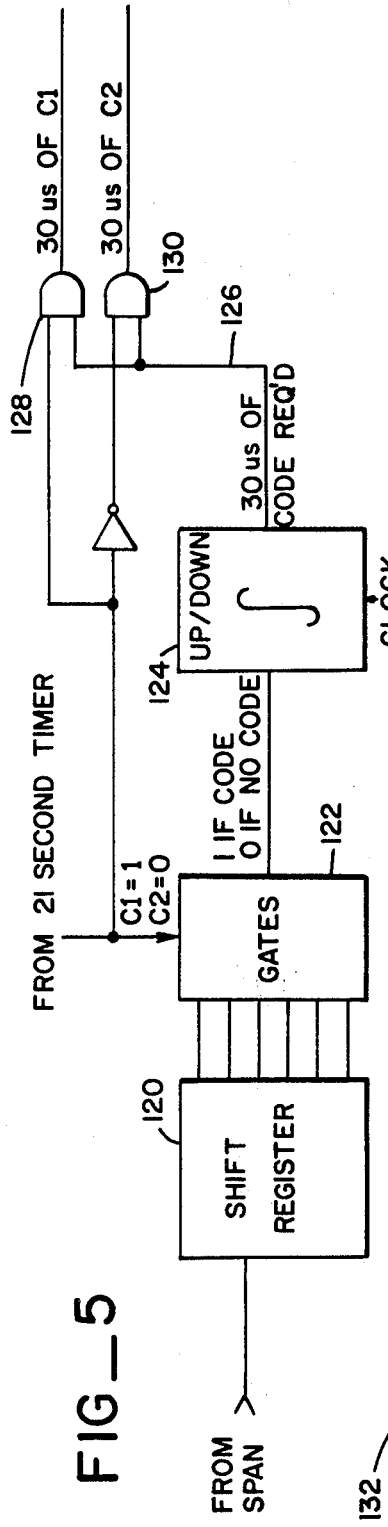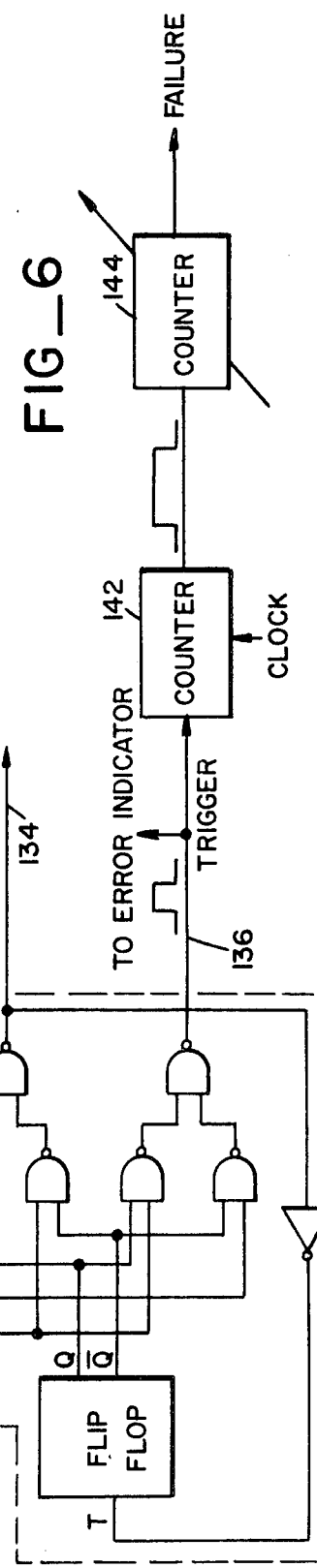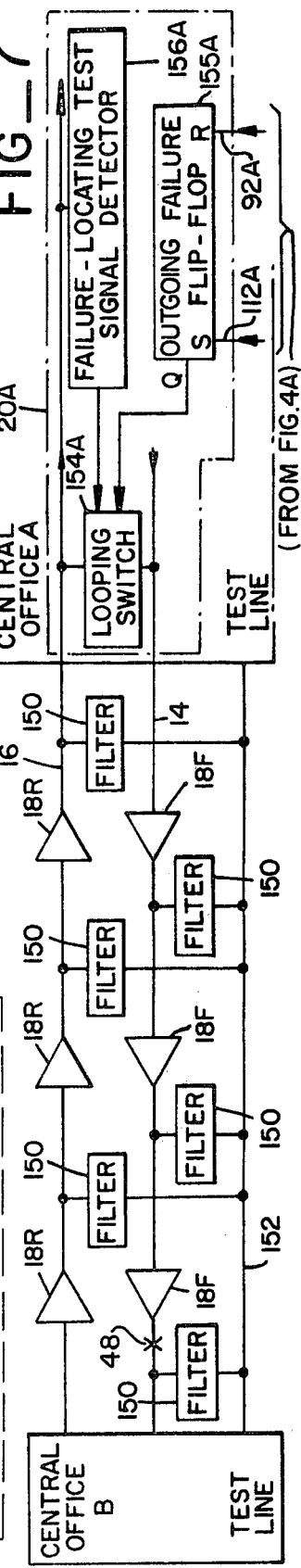

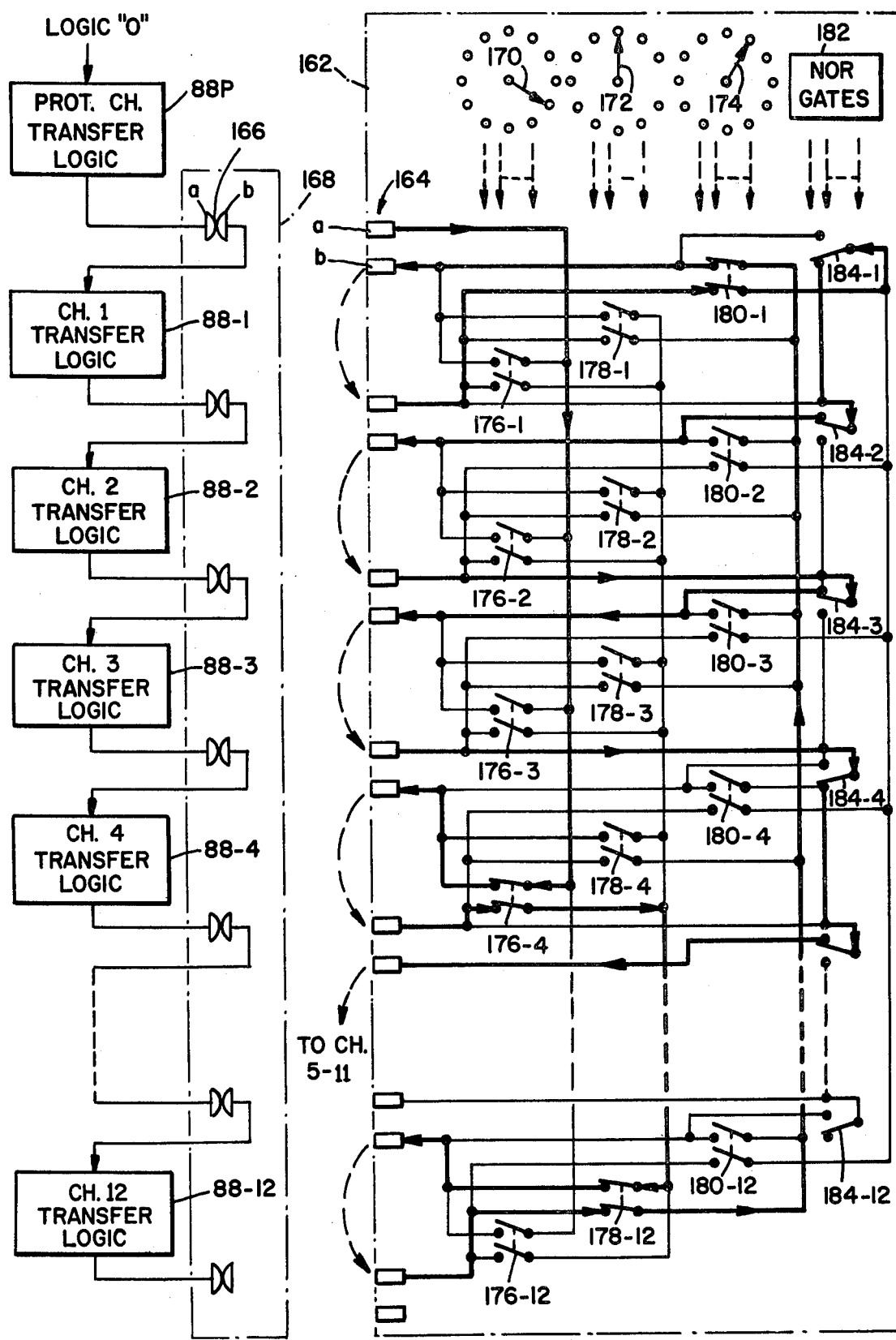
FIG_9

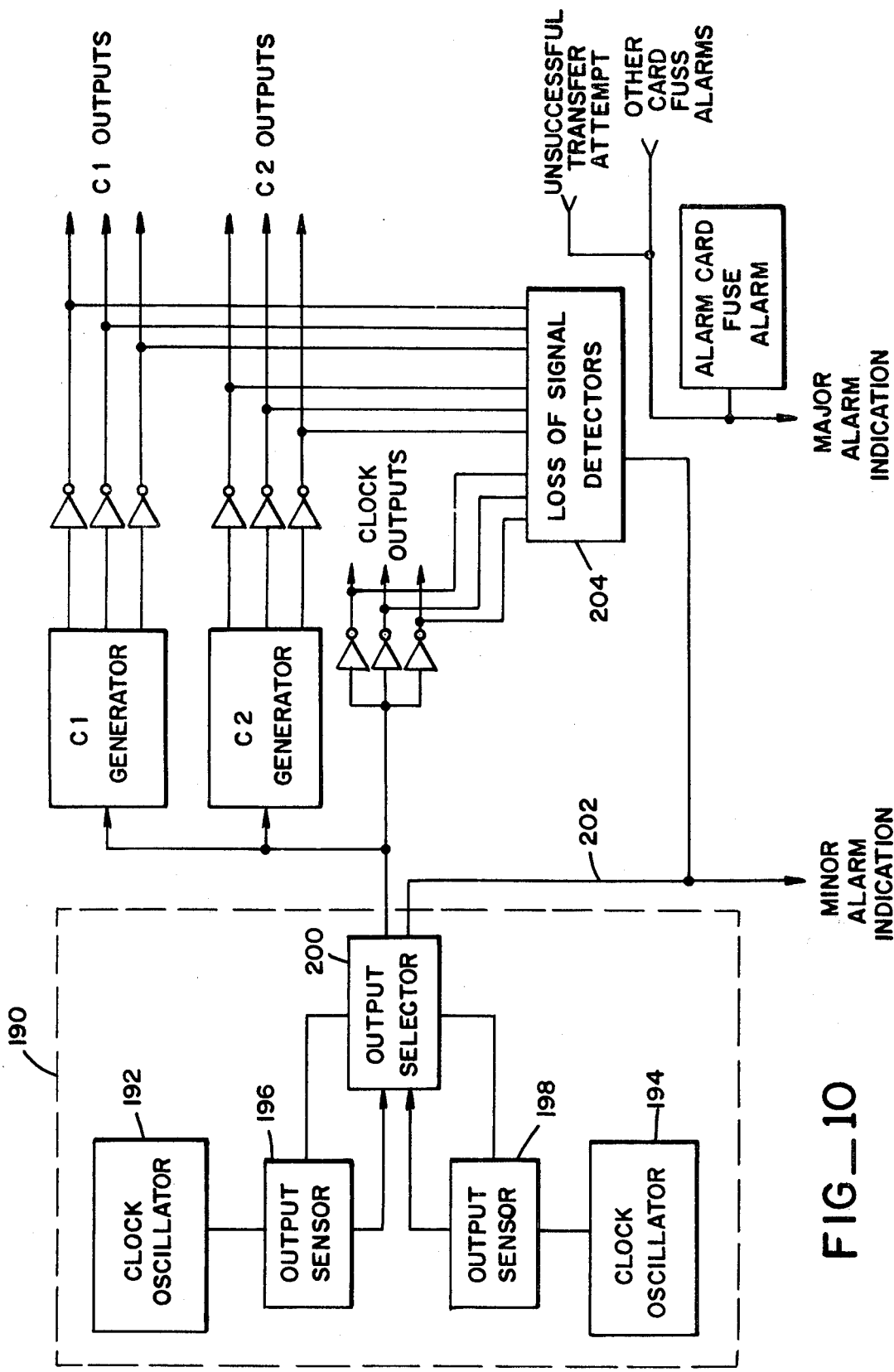
FIG_10

METHOD AND MEANS FOR DETECTING AN OUTGOING FAILURE IN A BIDIRECTIONAL COMMUNICATIONS SPAN AND LOOPING THE SAME IN RESPONSE THERETO

This is a division of Ser. No. 544,483, filed Jan. 27, 1975, now U.S. Pat. No. 3,983,340 issued 9/28/76.

BACKGROUND OF THE INVENTION

In the telephone art, voice or data communications are frequently carried on over pulse code modulated transmission lines which multiplex a number of subscriber circuits onto a common PCM channel.

Between central offices, these PCM channels are carried over so-called spans consisting usually of multi-wire cables provided with repeaters at regular intervals. The repeaters maintain the pulse trains within acceptable tolerances throughout the cable. Occasionally, however, a failure occurs in one of the repeaters which renders one of the span lines unserviceable. In this event, it is desirable to temporarily switch the affected circuit or "service" span over to a spare span provided for that purpose and known as the "protective" span, with the least possible loss of PCM signal. In this manner, interruption of traffic due to the failure of the single span line in a cable can be effectively prevented.

Automatic span line switches to accomplish this result have been known for some time. As a matter of example, such a device is shown in U.S. Pat. No. 3,715,503 entitled "Automatic Transfer Arrangement for Telephone System".

The prior art span switches, though serviceable, did, however, have some significant defects. For one, they were unable to determine whether a channel had failed due to span trouble or due to trouble in the channel equipment at the terminal, in which latter case the substitution of a protective span for the affected service span would not solve the problem.

For another, prior art devices were unable to recognize the direction in which a span had failed. Consequently, maintenance personnel had to either pick an end from which to test the span and hope they picked the right one, or travel to one end of the span, loop the line, go back and test from the other end, and then return to the first end and disconnect the loop.

With an increasing number of central offices being normally unattended, a problem also arose from the fact that prior art span switches were unable to advise the nearest manned central office of a span failure between two unmanned central offices without requiring special dedicated supervisory channels for that purpose.

Although some prior art systems did have the capability of automatically resetting when the service span became operable again, the two ends of the span were not able to reset sufficiently simultaneously to prevent significant interference (in the form of an audible click or a customer-discernible loss of data) with the traffic on the affected channel.

Finally, although rudimentary priority systems have previously been known in the art, they consisted simply of grouping lines into a pair of groups, the lines of one group having priority over the lines of the other. In practice, however, it is often necessary to establish more specific orders of priority and to make at least some of these orders changeable without rewiring the frame on which the span line switch is mounted.

SUMMARY OF THE INVENTION

The present invention overcomes these and other problems by incorporating the following features: (1) the device of this invention has the capability of isolating span troubles by transmitting and monitoring its own signal when signal transmission from the channel equipment is lost; (2) the device of this invention recognizes the direction in which the span has failed by transmitting special code words in both directions upon occurrence of a failure and determining in which direction the transmission is inoperative; (3) the invention provides special timing arrangements which permit transmission of the error signal to a distant central office without triggering the span switches of intermediate spans; (4) the system of the invention resets both ends of the span simultaneously to continue data transmission over the affected channel during resetting with no significant loss of data; (5) the system of the invention provides an extremely flexible priority arrangement which assigns an individual priority to each of the channels and permits changing the priority of any channel to the first, second, or third priority level while the channel is in use without interfering with traffic on the channel; and (6) the invention provides for automatic looping of any given end of a failed span whenever the apparatus of that end detects both that the failure is outgoing from that end, and that a fault-locating test signal is being injected into the span.

It is therefore the object of the invention to provide a span switch capable of isolating error conditions to span line trouble situations.

It is another object of the invention to provide a span line switch capable of recognizing the direction in which the span has failed.

It is still a further object of the invention to provide a span line switch which automatically loops the line at the power end by sensing when a failure-locating test signal is applied to the line while the line is in a failed condition.

It is another object of the invention to provide a span line switch capable of transmitting error indications to distant central offices without triggering adjacent span switches on the same channel.

It is yet another object of the invention to provide a span switch capable of transferring to a protective span at the earliest possible time after occurrence of a failure and to reset sufficiently simultaneously to prevent any customer-discernible interference with traffic.

It is still another object of the invention to provide a highly flexible priority system for the various channels of the channel bank, in which the priority of a channel can be changed at will without interference with traffic on that channel.

It is yet a further object of the invention to provide a span switch of the type described which is highly discriminating against transients on the line and against false error indications.

It is yet another object of the invention to provide a span switch of the type described in which the common equipment of the span switch provides redundancy and internal monitoring to minimize internal failure of the span switch apparatus. dr

BRIEF DESCRIPTION OF THE DRAWINGS

FIG. 1 is a schematic representation illustrating the environment in which the device of the invention is used;

FIG. 2a through FIG. 2f are schematic representations illustrating the sequence of events as the device of the invention copes with a span line failure;

FIG. 3 is a schematic representation illustrating the isolation of a span transfer to a single section of a channel extending between a plurality of central offices;

FIG. 4a and 4b together constitute a block diagram showing those portions of the inventive device on each end of a span which are involved in the transfer and reset process;

FIG. 5 is a detail block diagram showing the structure of the code receiver of FIG. 4;

FIG. 6 is a detail block diagram showing the structure of the bipolar violation detector of FIG. 4;

FIG. 7 is a schematic representation illustrating the automatic looping feature of the inventive device;

FIG. 8 is an elevational view of an equipment rack containing a channel bank and a corresponding span line switch set in accordance with the invention;

FIG. 9 is a schematized circuit diagram showing the priority selector of this invention; and FIG. 10 is a block diagram of the common equipment of the span switch set of FIG. 8.

DESCRIPTION OF THE PREFERRED EMBODIMENT

I. In General

FIG. 1 shows the environment in which the device of this invention is used. A pair of central offices A and B each have a plurality of terminals 10 containing channel equipment of an appropriate type, the exact nature of which is not material to this invention. Suffice it to say that the channel equipment transmits and receives a PCM signal representative of customer traffic, the PCM signal being commonly in bipolar format and having a pulse rate of 1.544 MHz. The channel equipment typically goes into a local alarm mode if it fails to receive an intelligible PCM signal with proper framing pulses for 350 milliseconds.

The central offices are connected by repeatered service spans 12-1, 12-2, etc. one for each channel. Customarily, there are 24 voice channels to a terminal and the invention described operates with from 1 to 24 such terminals. With a single shelf, as described herein, the invention protects up to 12 such terminals. Each span 12 is made up of a forward line 14 (forward, for the purposes of this specification, being defined as the direction from A to B) and a return line 16 (the signal path from B to A), both being equipped with repeaters 18.

For the purposes of the invention, a thirteenth span, the protective span 12-P, is added between the central offices A and B, and in each central office, span switches 20-1, 20-2, etc. are interposed, respectively, between each terminal 10 and the span associated therewith. The span switch 20-P associated with the protective span 12-P is not normally connected to any terminal 10, although there is no technical reason why the protective span could not also be used as a service span for an extra low-priority channel (dotted-line equipment in FIG. 1) when it is not being used for protection of a service span. The span switches 20 at each central office are interconnected by a forward transfer bus 22 and a return transfer bus 24.

As will be described more in detail hereinafter, each span switch 20 has, as an integral part thereof, a pair of monitoring units 26 and 28. The monitoring units 26 monitor the incoming signal from the channel equipment in terminals 10 and inject a steady stream of 1 pulses (to keep the span alive and to keep its repeaters from oscillating into a false signal mode) whenever the incoming signal is lost (or nonexistent, as in the case of the protective span). The monitoring units 28 monitor the incoming span lines at each central office for excessive bipolar violations and for loss of signal, the two most obvious failure parameters. Monitoring of bipolar violations at units 26 is unnecessary, because a sustained failure of this type in the terminal 10 will eventually take the channel equipment out of service, and a span which has transferred because of this failure will promptly reset.

As soon as a span failure is detected on a service span such as 12-1 by a monitoring unit 28, the channel associated with the failed span is automatically transferred, after only a 30 microsecond disconnection, to the protective span 12-P over the transfer buses 22 and 24 in a manner hereinafter described. Twenty-one seconds after the failed service span is restored to operative condition, the affected channel is reset, instantaneously and simultaneously at both central offices, to resume operation over the restored service span. If the protective span is itself inoperative, no transfer can take place; and if a higher-priority channel fails while a lower-priority channel is on the protective span, the higher-priority channel seizes the protective span, and resets the lower-priority channel to its assigned service span. Likewise, if the protective span is in use, it cannot be seized by another channel unless that channel has a higher priority.

II. Transfer and Reset

Turning first to FIGS. 2a through 2f, it will be seen that the heart of the inventive device's novel operation is the use of code sequences for transmitting failure, restoration, and switching information between central offices over the failed span itself to provide information not only of the span status but also of the direction in which the failure occurred, for purposes hereinafter explained.

FIG. 2a shows the normal situation with all spans operational. The forward PCM signal from terminal 10A goes through span switch unit 20-1A including closed electronic switch 32, forward span line 14-1 of service span 12-1 including repeater 18-1F, and span switch unit 20-1B including closed electronic switch 40 to terminal 10B. Likewise, the return PCM signal from terminal 10B proceeds to terminal 10A over the return line 16-1 of service span 12-1 and repeater 18-1R by virtue of the closure of electronic switches 34 and 42. At the same time, the code generators 30A and 30B keep the protective span 12-P alive by transmitting a train of 1 pulses from generator 30A over forward line 14-P to the open electronic switch 44, and from generator 30B over return line 16-P to the open electronic switch 38, respectively.

If a fault now occurs at point 48 in forward line 14-1 (e.g., a failure of repeater 18-1F), the detection of the fault by the monitor 28 (in FIG. 1) of span switch unit 20-1B causes a tranfer at central office B. The transfer at B opens electronic switches 40, 42 and closes switches 44, 46 in span switch unit 20-PB. However, switches 36, 38 in switch unit 20-PA are still open, and terminals 10A and 10B are momentarily disconnected from each other. Simultaneously with the transfer At B, code generator 30B injects code C1 into the return line 16-1, which is still operational even though span 12-1 is unusable for customer purposes.

Receipt of code C1 by span switch unit 20-1A for 30 microseconds or more causes a transfer to occur at central office A. As shown in FIG. 2c, the customer communication path between terminals 10A and 10B is now re-established in the forward direction through bus 22A, switch 36, line 14-P, switch 44, and bus 22B; and in the return direction, through bus 24B, switch 46, line 16-P, switch 38, and bus 24A. Simultaneously, code generator 30A injects code C1 into the failed line 14-1.

Whenever a span switch unit 20 receives twenty-one seconds of fault-free signal from its span while operating in a transferred mode, its code generator switches from code C1 to code C2. Consequently, and inasmuch as return line 16-1 is still operational, the conditions of FIG. 2c are replaced, after a twenty-one second interval, by the conditions of FIG. 2d. Inasmuch as the fault 48 is still present, the C2 signal from code generator 30A does not reach span switch unit 20-1B. The circuit now remains in the condition of FIG. 2d until the fault 48 is cleared either by clearance of the fault-causing condition or by the intervention of maintenance personnel.

As soon as the fault 48 is cleared, C2 code (which is a valid signal as far as the monitoring units are concerned) starts to reach span switch unit 20-1B. Twenty-one seconds later, code generator 30B also starts transmitting code C2 (FIG. 2e). Thirty microseconds after a span switch unit 20 both receives and sends code C2, it resets (FIG. 2f). Consequently, (disregarding any transmission delays in the span) central offices A and B reset simultaneously, thereby preventing any line clicks or loss of customer data during the resetting operation.

The resetting ends any code transmission by the code generator 30A and 30B, and the circuit is now once again in the normal condition of FIG. 2a.

FIG. 3 shows how an alarm condition at any point of a line extending through several central offices can be transmitted to a distant central office without causing unaffected spans to switch. FIG. 3 shows four central offices A, B, C, and D each connected to the next by a service span S and a protective span P. Each set of spans is equipped with a pair of span switches T, one at each end. Each span switch T contains an alarm board L. The physical appearance of the alarm board L is shown in FIG. 8, and it will be noted that each board has a "line fail" light 50. The circuitry of the span line switches T is so arranged and timed, as hereinafter described, that whenever a span line switch T receives or sends code C1 for 10 microseconds, the "line fail" light comes on. It will be recalled that the transfer to the protective span does not occur until the C1 code has persisted for 30 microseconds.

Let us now suppose that a break occurs in service span $S_{BC}$ as indicated by that span. Upon the occurrence of the break 48, span line switch $T_{2BC}$ immediately starts to transmit code C1 toward the left over the as-yet functional return line of service span $S_{BC}$. This C1 code is propogated through $T_{1BC}$, $T_{2AB}$ and service span $S_{AB}$ to span line switch $T_{1AB}$. When the C1 code transmitted by switch $T_{2BC}$ has persisted for 10 microseconds, the "line fail" lights in switches $T_{1BC}$ and $T_{1AB}$ (switches $T_{2BC}$ and $T_{2AB}$, being on the sending end of their respective spans, do not see C1 at their code receivers) come on. At the same time that it transmits code C1 to the left, span line switch $T_{2BC}$ also transmits code C1 for only 20 microseconds to the right through switch $T_{1CD}$ and the forward line of span $S_{CD}$ to span line switch $T_{2CD}$. After 10 microseconds, this will also cause the "line fail" lights in switch $T_{2CD}$ to come on.

When any span line switch such as $T_{1BC}$ has received code C1 for 20 microseconds, the span line switch circuit blocks further propagation of the C1 signal through the switch and therefore prevents any further C1 code from reaching switches $T_{2AB}$ and $T_{1AB}$. Consequently, at the expiration of the 30 microsecond period from the first appearance of the C1 code, switches $T_{1AB}$ and $T_{2AB}$ no longer see any C1 code and therefore do not transfer. Likewise, switches $T_{1CD}$ and $T_{2CD}$ no longer see any C1 code and therefore also do not transfer. $T_{1BC}$ and $T_{2BC}$, however, continue to see code C1, and at the expiration of 30 microseconds these two span line switches switch the service span $S_{BC}$ onto the protective span $P_{BC}$. From this point on, the spans extending between central offices B and C continue to function in the failure mode until service is restored as hereinabove described, while the spans extending between central offices A and B and between C and D continue functioning normally as if no break had occurred. However, the "line fail" lights, which are equipped with a lock-in circuit, remain lit in all four central offices, and if any one of these offices is manned, a failure indication will promptly be conveyed to maintenance personnel.

For a description of how the functions of FIGS. 2a through 2f and 3 are performed, we now turn to FIG. 4. FIG. 4A shows the transfer-and-reset equipment of a span switch unit 20A at central office A, while FIG. 4B shows the identical equipment in the corresponding span switch unit 20B at central office B. Under normal circumstances, a PCM data signal enters span switch unit 20B from repeater 18F over forward span line 14. The incoming signal is applied to bipolar violation threshold detector 52B (described in more detail in FIG. 6), loss-of-signal detector 54B, code receiver 56B (described in more detail in FIG. 5) and AND gate 58B. The detectors 52B and 54B together constitute the monitoring unit 28 of a span switch 20 in FIG. 1.

If forward line 14 fails, either or both detectors 52B; 54B produce an output. The outputs of detectors 52B and 54B are OR'd together to produce an "incoming failure" signal on line 60B. This signal sets incoming failure flip-flop 62B and causes the substitution of code C1 for the PCM signal from line 64B (i.e., traffic or, in its absence, clock) on return span line 16. The substitution is accomplished from the output of OR gate 114B by cutting line 64B off at AND gate 66B and enabling AND gate 68B to feed C1 into line 16, from code generator 30B (which generates its codes continuously) through code transmission selector switch 70B (which is normally set to select C1) and OR gate 72B.

The C1 code transmitted from central office B over return span line 16 is picked up by code receiver 56A at central office A. The code receivers 56 are normally set to listen only for code C1 (which may be, for example, 100100 repeated indefinitely) and to ignore C2 (which may be, for example, 110110 repeated indefinitely). When code receiver 56A has received code C1 steadily for ten microseconds, it send out a pulse on line 74A which lights and locks in the "line fail" light 50 (FIG. 8) for the span involved. It will be noted that code C1 at this time propagates all the way through central office A and therefore also lights the "line fail" light in all upstream receiving span switch units 20 along the affected channel.

After code receiver 56A has received code C1 for 20 microseconds, line 76A goes to logic 1 and cuts off further propagation of the C1 signal coming in from return line 16 by negating the inverted input of AND gate 58A for 26 microseconds, during which time gate 78A injects a stream of 1 pulses into the channel in the upstream direction. As previously explained, the cut-off of C1 propagation after 20 microseconds prevents operational upstream spans on the same channel from being transferred.

The incoming failure signal on line 60B causes OR gate 81B to produce a transfer order signal on line 82B. If the priority line 84B into the span switch unit under consideration is a logic 0 (see the discussion of the priority system hereinbelow), the transfer is permitted, and gate 86B transmits a transfer command to the "set" terminal of the flip-flop portion of transfer logic 88B. If desired, a transfer can be manually prevented by energizing the "reset" terminal of transfer logic 88B from manual reset switch 90 (FIG. 8) over line 92B. If a transfer order appears on line 82B but the transfer logic 88B fails to transfer for any reason (e.g., when a higher-priority span has already seized the protective span), traffic is lost on the affected channel, and AND gate 94B triggers a major alarm (FIG. 10) to summon maintenance personnel.

The transfer logic 88B, it will be noted, sets immediately upon detection of an incoming failure. Its setting blocks gate 98B and energizes a pulse generator 96B which produces a single 20 microsecond pulse. This pulse is applied to gates 100B and 102B as shown and feeds code C1 directly from the code generator 30B into the channel equipment of central office B in a forward direction over line 104B for 20 microseconds. This burst of C1 replaces the failed traffic signal from forward line 14 and lights the downstream "line fail" lights but is too short to transfer any downstream spans of the affected channel. There is no problem of downstream propagation of the failure parameters themselves because proper bipolarity is inherently restored by the central office equipment before transmission of the PCM signal into the next span, and because loss of signal simply causes the equipment-loss-of-signal detector (i.e., monitoring unit) 26 of the next span to substitute keep-alive clock pulses, as explained above in the description of FIG. 1, for the missing traffic signals before any span-loss-of-signal detector 54 has time to react to any loss of signal.

The setting of transfer logic 88B closes electronic transfer switches 106B and 108B, which enable connection of the channel equipment to the protective span buses 22B and 24B, respectively. At the same time, the setting of the transfer logic 88B starts the 21-second timer 110B for a purpose hereinafter described. It also lights the "line transfer" light 109 and "history" light 110 (FIG. 8). The former indicates a line transfer in progress, the latter locks in and holds the transfer indication until manually reset by reset button 113.

At the end of the 20 microsecond pulse from pulse generator 96B, gates 100B and 102B return to their original condition. The further transmission of code C1 through gate 100B is thus blocked, while the forward bus 22B of the protective span becomes connected by gate 102B to the channel equipment through the now closed switch 106B. The faulty signal from failed forward line 14 remains blocked by gate 98B. Inasmuch as central office A has not yet transferred, forward bus 22B carries no office A has not yet transferred, forward bus 22B carries no traffic as yet, but it does carry the keep-alive clock pulses transmitted by all lines in the absence of traffic. The return bus 24B does now carry traffic, but it is not yet connected to anything in switch unit 20A because switch 106A is still open.

At this point, central office B has transferred but central office A has not yet done so, as there has been no failure in return line 16. However, when code receiver 56A receives code C1 for 30 microseconds, line 112A becomes energized and a transfer order is issued through OR gate 80A. This in turn causes the transfer logic 88A to set (assuming that a transfer is permitted), and traffic can now flow in both directions over the protective span.

With gate 98A disabled by the transfer, return line 16 is disconnected from the channel equipment of central office A, and transmission of C1 from return line 16 through gate 58A can safely resume without affecting any upstream spans. This occurs, as explained above, 26 microseconds after the energization of line 76A, i.e., a total of 46 microseconds following the initial receipt of code C1 by code receiver 56A, which is simultaneous with the initial fault detection at central office B.

The system is now stabilized in the transferred mode, with central office B sending code C1 over return line 16. Because of the Q signal from the now set transfer logic 88A OR'd through gate 114A, central office A also sends code C1 over forward line 14, although this latter transmission never reaches central office B due to the fault in line 14.

Twenty-one seconds after the transfer (which energizes its set input from Q of logic 88A), timer 110A energizes its outputs and switches code transmission selector 70A to transmit code C2, and code receiver 56A to recognize only code C2. Timer 110B, however, does not switch because it is constantly reset by the incoming failure signal on line 60B. Therefore, central office B continues to send and to listen for code C1.

When the fault in line 14 has been cleared, the C2 transmission from central office A reaches code receiver 56B. However, inasmuch as code receiver 56B is still in the C1 mode, the C2 transmission goes unrecognized. Timer 110B, on the other hand, starts timing because there is no more incoming failure signal 60B to reset it. If line 14 stays good for twenty-one seconds, timer 110B switches, and central office B now also sends and listens for code C2.

When code receivers 56A and 56B recognize code C2 for 30 microseconds (this occurs simultaneously in both central offices) the reset controls 116A, 116B are actuated to reset incoming failure flip-flop 62B, outgoing failure flip-flop 155A (FIG. 7), and the flip-flop sections of transfer logics; 88A, 88B. Resetting of these flip-flops returns all circuits to their normal condition, which includes the resetting of timers 110A,110B by removing their set input energization coming from the Q outputs of transfer logics 88A and 88B, respectively.

The functioning of code receivers 56 is shown in more detail in FIG. 5. The incoming PCM signal from the span is applied to a shift register 120 whose parallel outputs are applied to logic gates 122. The output of timer 110 (FIG. 4) is normally 1, and it goes to 0 at the end of its 21-second timing interval. The gates of the logic 122 are so designed, in accordance with conventional practices, that the output of logic 122 is 1 when the shift register 120 contains the code indicated by the timer 110, and 0 when it does not.

In an uncoded pulse train, logic 122 will put out no more 1 pulses, on the average, than it does 0 pulses. Consequently, by applying the 1 output of logic 122 as an up-count to an integrating counter 124 and the 0 as a downcount, the integrating counter 124 will produce an overflow output on line 126 only when the desired code is consistently received for a predetermined length of time. The output 126 can be used, after gating through code selection gates 128, 130, as the 30 microsecond outputs of the code receiver 56. Similar circuitry is, of course, provided for the 10 microsecond and 20 microsecond outputs of code receiver 56.

The bipolar violation threshold detector 52 is shown in more detail in FIG. 6. The positive and negative rails of a two-rail bipolar PCM input from the span are combined in a combining logic 132 to put out pulses on line 134 when a positive pulse is always followed by a negative pulse and vice versa, and on line 136 when two pulses of the same polarity follow one another. Lines 134 and 136 carry, respectively, the signals applied to the pulses light 138 and the errors light 140 (FIG. 8).

Error pulses appearing on line 136 are applied to the counter 142. The counter 142 is arranged to be triggered by an error pulse to put out a logic 1 for a period of 512 clock pulses (about 300 microseconds). During this time the counter 142 is insensitive to further triggering. As a result, a short burst of a few hundred consecutive error pulses (typical of a transient malfunction) will put out only one pulse from counter 142.

The output of counter 142 is fed to counter 144, which responds to the count of sixteen 300-microsecond pulses in a given length of time. This length of time is adjustable so that the error rate constituting a failure indication can be varied at will. In practice, the shortest time used is on the order of 5 milliseconds, corresponding to an error rate of about $10^{-4}$. The output of counter 144 is the output, in FIG. 4, of bipolar violation threshold detector 52. To provide a switching hysteresis, the error rate for resetting timer 110 is to be one order of magnitude lower than the rate set for triggering a failure indication.

Returning to FIG. 4, it will be seen that the circuitry of FIG. 4 can be exactly alike for all span switch units 20 (FIG. 1) including the protective span units 20-P. In units 20-P, of course, there is no channel equipment to which lines 104A,B and 146A,B can be connected, and lines 104 and 146 are therefore connected, instead, to the protective span buses 22, 24. Conversely, in units 20-P, the electronic switches 106A,B and 108A,B are not connected to anything.

As long as the protective span is not in use, no signal appears on lines 146A, 146B. Consequently, the loss-of-signal detectors 26A, 26B (which are the monitors 26 of FIG. 1) of protective span switch units 20-PA and 20-PB enable gates 148A and 148B, respectively, and inject clock into the protective span 12-P as shown in FIG. 2a.

III. Automatic Test Looping Feature

The present invention greatly facilitates testing of a faulty line by providing an automatic test looping feature.

Referring to FIG. 7, a PCM span is conventionally tested by injecting into the line (e.g., line 16) of test tone consisting of a pulse train containing bipolar violations at regular intervals, (commonly every 4th to 11th pulse). These bipolar violations are inserted in the positive direction for a given period of time (say 500 microseconds), then in the negative direction for an equal period of time. Integration of this pulse train produces an audio tone whose frequency is determined by this rate of alternation (e.g., in this instance, the tone would be a 2KHz tone).

Throughout the span, the output of each repeater 18F or 18R is connected through an integrator-filter 150 is a test line 152. By monitoring the test line 152 while varying the frequency of the audio tone to accommodate, one by one, the various filters 150, the location of the failure 48 can be identified. In the past, this procedure had to be carried out separately from central office A for repeaters 18F and then from central office B for repeaters 18R, or the line had to be looped manually at the proper end.

In accordance with the invention, the testing can be carried out from either central office without assistance at the other. For this purpose, the span switch unit 20A (shown, for clarity only, in central office A in FIG. 7, although an identical unit, not shown is also provided in central office B) is equipped with an electronic looping switch 154A which bridges the forward line 14 and the return line 16 when it is enabled both by signal from the Q output of outgoing failure flip-flop 155A (set from line 112A and reset from line 92A in FIG. 4A) indicating a failure 48 in the forward line 14, and by the test tone sensor 156A.

It will be understood that if the testing technician happens to be located at central office A, he can only inject the test signal into forward line 14. Because the failure is in this line, he will locate the failure without any need for a looping of the span at central office B. On the other hand, if the testing technician happens to be located at central office B, he can only inject the test signal into return line 16. Inasmuch as the return line 16 is good, the technician will find no failure in it, and looping at central office A now becomes necessary in order for the test signal to loop at A from return line 16 over into forward line 14 and back toward central office B until it reaches the failure point 48.

The test tone sensor 156A is of conventionl construction and does two things: (1) it continuously tests the pulse train for bipolar violation rates greater than one violation for each fifty pulses; and (2) it continuously tests the pulse train for the occurrence of bipolar violations alternating in polarity at an audio frequency. If both conditions are met, an enabling signal is transmitted to the looping switch 154A.

IV. Priority System

The priority system of this invention is designed to perform two basic functions: (1) to establish a built-in priority scheme in which the protective span, in case of a multiple failure, is always accessible to the highest-priority failed service span, even though this means disconnecting a failed service span of lower priority from an already-seized protective span; and (2) to make it possible, without any service interruption, to substitute a selectable priority scheme for the built-in scheme.

For example, consider that in a central office of a large city, a set of PCM line equipment is arranged on its rack as shown in FIG. 8. The twelve channel units are shown at 160-1 through 160-12, while the corresponding span line switches are shown at 20-1 through 20-12, the switch for the protective span being designated as 20-P. Let it next be assumed that the PCM cable under consideration carries an FAA channel linkage, e.g., a control tower to a radar site, a toll channel, an extended area service channel), and some local channels. The priorities are as follows: FAA first, toll second, extended area service third, and local service last.

It will be readily recognized that in order to avoid confusion in installation and maintenance, the logical way of doing things is to connect each channel unit straight to the span line switch directly above it. If the FAA line is connected to channel 1, the toll line to channel 2, and the EAS line to channel 3, the built-in priority of the invention takes care of the situation as hereinafter described, and no special priority system is required. However, this is not usually a practical way of doing things, and in a typical installation, the FAA line may be connected to channel 4, the toll line to channel 12, and the EAS line to channel 1, with local lines on all other channels.

For this reason, it is usually desirable to incorporate into (or add to) the system a selectable priority arrangement as shown in FIG. 9. This arrangement preferably takes the form of a printed circuit card 162 whose terminals 164 can be inserted between the normally closed contacts 166 of a connector 168 in the rack.

Looking first at the left side of FIG. 9, the built-in priority arrangement of the invention is simply a "daisy chain" in which control goes to the highest logic which chooses to exercise control. Specifically, each switching unit of the span line switch (including the protective span unit) contains a transfer logic 88 whose functioning has been described hereinabove. Suffice it to say at this point that whenever a transfer logic 88 transfers its channel to the protective span, its output in the "daisy chain" of FIG. 9 (labelled "priority line" in FIGS. 4A and 4B) goes to logic 1 regardless of the logic level of its input. As long as the channel is connected to its own span, the output logic level of its transfer logic 88 is the same as its input logic level. Conversely, no switching unit can effect a transfer unless the input of its transfer logic 88 is at logic 0.

Consequently, in the absence of the priority card 162, the highest transfer logic which has transferred takes control and disables all lower logics by sending a logic 1 down the "daisy chain". If a still higher transfer logic decides to transfer, it will take control and reset the logic previously in control by feeding the previously controlling transfer logic a 1.

When it is desired to modify the built-in priority, the priority card 162 shown on the right side of FIG. 9 is inserted into the connector 168, where the contacts 166 are opened and their $a$ and $b$ sides, respectively, connected to the corresponding $a$ and $b$ terminals on the card 162. A plurality of priority selectors 170, 172, and 174 are provided on the card 162 (three are shown in FIG. 9) to select the channel having first, second, and third priority, respectively. The first priority selector 170 operates the double-pole, single-throw first-priority switches 176-1 through 176-12, one of them for each position of first-priority selector 170. (It will be understood that switches 176-1, 176-2, 176-3 and 176-12 are shown in symbolic form in FIG. 9, and that in reality they would normally be electronically operated solid-state gates such as field-effect transistors or the like.)

In like manner, the second-priority selector 172 operates the second-priority switches 178-1 through 178-12, and the third-priority selector 174 operates the third-priority switches 180-1 through 180-12. NOR gates 182 are controlled by the priority selectors 170, 172 and 174 and are arranged to operate (in an upward direction in the symbolic representation of FIG. 9) all those of the bypass switches 184-1 through 184-12 which are associated with a channel that has not been selected for either first, second or third priority.

With this in mind, the "daisy chain" modified to give first priority to channel 4 (the FAA line), second priority to channel 12 (the toll line), and third priority to channel 1 (the EAS line), operates as shown in heavy lines on card 162 of FIG. 9, the priority selectors being set to operate their associated priority switches and bypass switches as shown.

It at some future time it becomes necessary, for example, to temporarily allocate channel 3 to a top-priority military circuit, the priorities can be simply changed by removing card 162 from the rack (during which time the built-in priority takes over without any service disruption), moving the priority selectors 170, 172 and 174 to positions 3, 4 and 13 respectively, and reinserting the card 162 into the rack. It will be noted, incidentally, that in doing so the EAS line (channel 1) retains its priority over the local circuits because it is the highest of the non-selected channels.

It should be noted that if the protective span fails, its transfer logic operates as described hereinabove although its operation has no effect on the channel circuits. By doing so, the transfer logic 88-P puts out a logic 1 and prevents the service channels from effecting a transfer.

V. Code Generation System

As shown in FIG. 10, the device of this invention derives its clock and code signals from a master oscillator unit 190. The unit 190 contains a pair of oscillators 192, 194 which are independently operable. Each oscillator is continuously tested by an output sensor 196 or 198, and its output is conveyed to output selector 200. The output selector 200 is essentially a flip-flop circuit which originally sets at random in either mode and is triggered into the other mode by a lost-output signal from the output sensor for the mode in which it is currently operating.

Consequently, the inventive device has redundancy in its clock generating capability, with an automatic switchover to another oscillator if the oscillator in use fails. An oscillator failure is therefore not a traffic-interrupting malfunction, and the output signal on line 202 to the minor alarm indicator 204 (FIG. 8) when either output sensor 196 or 198 produces a lost output signal.

Each clock output and each code output is separately monitored for loss of signal by a bank of loss-of-signal detectors, any one of which also triggers a minor alarm when activated.

Major alarms are traffic-interrupting conditions such as an unsuccessful transfer attempt (as indicated by the output of a gate 94 in FIG. 4) or a blown fuse are also provided to light the major alarm light 206 (FIG. 8) and to summon maintenance personnel by conventional means.

What is claimed is:

1. An automatic looping system for testing a failed PCM span having an incoming and an outgoing line to locate the failure therein, comprising:
span switch means connected to the span to be tested at each end thereof;
looping switch means in said span switch means for looping said span in response to a control signal;
means in each of said span switch means for sensing whether said failure is in the incoming or the outgoing line;
detection means in each of said span switch means for detecting the receipt, over said span, of a test signal of the type used in testing PCM spans; and means associated with said sensing and detection means for producing said control signal when said failure is in the outgoing line and a PCM test signal appears on said incoming line of said span.

2. The method of automatically looping for test purposes, a PCM span having an incoming and an outgoing line,
   a. detecting, at one end of said span, a condition indicative of a failure in the outgoing line of said span;
   b. detecting, at said one end of said span the receipt, over the incoming line of said span, of a signal having predetermined parameters identifying it as a span test signal; and
   c. looping said span at said one end whenever both an outgoing failure and the presence of a span test signal are being detected concurrently.

3. In a communication system in which information is conveyed between first and second spatially separated terminals over a span which includes a first communication path over which information is transmitted from said first to said second terminal, and a second communication path over which information is transmitted from said second terminal to said first terminal, the improvement comprising:
   a. means at said first terminal for detecting a failure of said span;
   b. means at said first terminal for detecting whether said failure is in said first or said second communication path; and
   c. means at said first terminal for looping said first and second paths at said first terminal, said looping means being inoperative unless a failure is detected in said first communication path.

* * * * *

UNITED STATES PATENT OFFICE
CERTIFICATE OF CORRECTION

Patent No. 4,042,794      Dated August 16, 1977

Inventor(s) Paul J. Lima and Todd V. Townsend

It is certified that error appears in the above-identified patent and that said Letters Patent are hereby corrected as shown below:

Column 2, line 38 - "power" should read --proper--.

4, " 65 - "At" should read --at--.

6, " 60 - "send" should read --sends--.

7, " 66 - "office A has not yet transferred, forward" should be deleted.

7, " 67 - "bus 22B carries no" should be deleted.

10, " 39 - "conventionl" should read --conventional--

10, " 66 - "channel)" should read --channel--.

11, " 67 - "not" should read --not--.

13, " Claim 2, line 8- After "line," insert --comprising the steps of:--.

Signed and Sealed this

Twenty-eighth Day of July 1981

[SEAL]

Attest:

GERALD J. MOSSINGHOFF

Attesting Officer     Commissioner of Patents and Trademarks